United States Patent [19]

Ogiso

[11] 3,875,429

[45] Apr. 1, 1975

[54] PULSE SIGNAL GENERATING CIRCUIT AND CONTROL CIRCUIT USING THE SAME

[75] Inventor: Mitsutoshi Ogiso, Kawasaki, Japan

[73] Assignee: Canon Kabushiki Kaisha, Tokyo, Japan

[22] Filed: Nov. 15, 1972

[21] Appl. No.: 306,841

[30] Foreign Application Priority Data

Nov. 18, 1971 Japan .............................. 46-108045

[52] U.S. Cl. ................. 307/246, 307/247, 307/269, 307/273

[51] Int. Cl. ............................................. H03k 3/57

[58] Field of Search ........... 307/246, 273, 241, 269; 95/10 CT, 10 CD; 328/75

[56] References Cited

UNITED STATES PATENTS

| | | | |
|---|---|---|---|
| 3,435,299 | 3/1969 | Schwartz | 307/273 X |
| 3,461,313 | 8/1969 | Hansen | 307/273 X |
| 3,529,183 | 9/1970 | Goldstein | 307/273 X |
| 3,590,282 | 6/1971 | Ehat | 307/273 |

OTHER PUBLICATIONS

Abramson et al., "Power Source for Guard Tone," IBM Tech. Discl. Bull., Vol. 12, No. 9, Feb., 1970, p. 1506.

*Primary Examiner*—Rudolph V. Rolinec
*Assistant Examiner*—William D. Larkins
*Attorney, Agent, or Firm*—Fitzpatrick, Cella, Harper & Scinto

[57] ABSTRACT

Control signal generating circuit generates a signal upon completion of the first control operation to control the second control operation. Thus, the signal generating circuit is effectively used to sequentially accomplishing a series of various controls. The signal generating circuit is usually incorporated in a control circuit to attain the desired control operations.

5 Claims, 6 Drawing Figures

PULSE SIGNAL GENERATING CIRCUIT AND CONTROL CIRCUIT USING THE SAME

BACKGROUND OF THE INVENTION

The present invention relates to a pulse signal generating circuit and a control circuit using the same.

In order to control various operations continuously or sequentially by an electronic control circuit, it is required that after the first control step has been completely accomplished the second control step must be started and after the second control step has been completely accomplished the third control step must be started, and so on. For example it is desired to take pictures sequentially by a plurality of cameras each mounting a motor-driven film winding device. In this case only after the exposure and then the film winding in the first camera have been accomplished, the shutter of the second camera is released and thereafter the film in the second camera must be advanced, and the similar operations are sequentially cycled in each camera. That is, in response to the signal representing that the exposure and then the film winding have been completely accomplished in the preceding camera, the film winding device of the next camera must be actuated. If the film winding device of the next camera should be actuated before the exposure and the film winding in the preceding camera have been accomplished, the pictures cannot be taken sequentially. Another example of a sequential control is to set the aperture of a camera and then to control the shutter speed.

In order that after one control step has been accomplished the next control step may be started, a control circuit requires a signal generating circuit of the type which generates a signal upon completion of the first control step and to apply this signal as an actuating signal to a circuit or the like controlling the second control step.

SUMMARY OF THE INVENTION

One of the objects of the present invention is therefore to provide a control signal generating circuit of the type described above and simple in construction and capable of generating a desired control signal.

BRIEF DESCRIPTION OF THE DRAWING

The above and other objects, features and advantages of the present invention will become more apparent from the following description of some preferred embodiments thereof taken in conjunction with the accompanying drawing in which:-

Referring to FIG. 1, reference numeral 1 designates a power source consisting of batteries; 2 designates an ON-OFF switch which may be a mechanical switch or a conventional electronic switch comprising a transistor, SCR or the like; 3 designates a load which is driven by the power source 1 for accomplishing the first control step and which may be a motor or solenoid; and component parts 4–10 constitute a pulse signal generator in accordance with the present invention. That is, reference numeral 4 denotes a matching transistor; 5 is a base resistor of the transistor 4; 6 is an emitter resistor; 7 is a diode for preventing the reverse current; 8 is a collector resistor; 9 is a capacitor; and 10 and 10' are a pair of output terminals to be connected to a pair of input terminal of a next succeeding control circuit for accomplishing the second control step (not shown).

Figure 1:
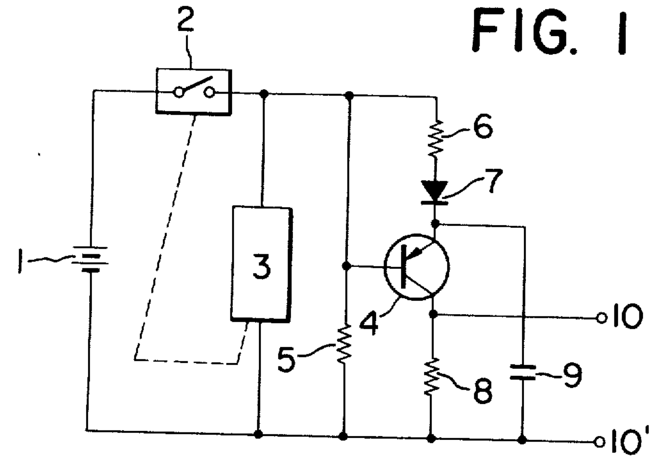
FIG. 1 is a diagram of a fundamental control pulse signal generating circuit in accordance with the present invention.

When the switch 2 is closed, the load circuit 3 which may be a motor or the like is driven so as to accomplish the first control step. In this case transistor 4 is cut off because of the base resistor 5, and the capacitor 9 is charged through the emitter resistor 6 and the diode 7. The charging time constant of the capacitor 9 is dependent upon the resistor 6 and the capacitance of the capacitor 9 so that the capacitor 9 may be instantaneously charged when a suitable combination of the resistor 6 and the capacitor 9 is selected. Even when the capacitor 9 is completely charged, the emitter potential of the transistor 4 is not higher than the base potential so that the transistor 4 remains in the nonconduction state. As a result, the capacitor 9 is not discharged through the transistor 4. The switch 2 is so connected to the load circuit 3 that when the motor or the like coupled to the load circuit 3 accomplishes the first control step the switch 2 is opened. For example the switch 2 is so arranged that when the motor rotates through a predetermined angle the switch 2 is opened. When the switch 2 is opened, the base potential of the transistor 4 becomes zero so that the transistor 4 is conducted. As a result the capacitor 9 is discharged through the transistor 4 and the resistor 8 so that a positive control pulse signal is derived from the pair of output terminals 10 and 10'. The waveform of this control pulse signal is dependent upon the capacitor 9 and the resistor 8. The control pulse signal is applied to the circuit (not shown) for accomplishing the second control step.

The fact that the switch 2 is closed is memorized by the capacitor 9 which is charged. That is, the capacitor 9 is a memory element. Instead of the capacitor 9 a coil 19 as shown in FIG. 2 may be used as a storage element because when the switch 2 is closed the coil 19 stores the electromagnetic energy. In the second embodiment shown in FIG. 2 the component parts are similar to those shown in FIG. 1 except the coil 19 and corresponding components are designated by reference numerals which put 10's to the reference numerals used in FIG. 1.

Figure 2:
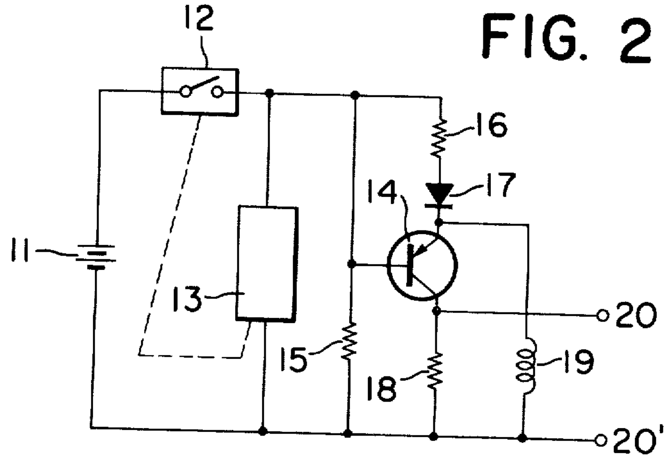
FIG. 2 is a diagram of a variation of the circuit shown in FIG. 1.
Figure 3:
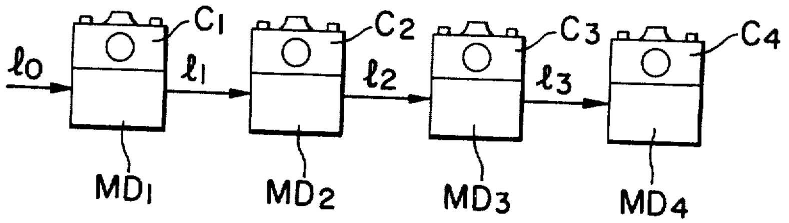
FIG. 3 is a schematic diagram of a plurality of automatic film winding devices each incorporating the control pulse signal generating circuit of the type shown in FIG. 1 or FIG. 2 for taking a series of pictures sequentially.

FIG. 3 is a schematic view illustrating a continuous photographing device using the control pulse signal generator of the type shown in FIG. 1 or FIG. 2 for automatically controlling the film winding operations of a plurality of cameras. In FIG. 3, automatic winding devices $MD_1$–$MD_4$ are mounted on the bottoms of cameras $C_1$–$C_4$ and coupled operatively to the film winding devices and shutter release devices in the cameras. The automatic winding devices $MD_1$–$MD_4$ are interconnected with lead wires $l_1$–$l_3$. In response to the release signal applied over the lead wire $l_0$ to the first automatic winding device $MD_1$, the camera $C_1$ automatically releases the shutter and winds the film. Upon completion of the film winding the control pulse signal is generated and applied through the lead wire $l_1$ to the second automatic film winding device $MD_2$ so that the second camera $C_2$ releases the shutter and thereafter winds the film. In a similar manner, the shutter release and film winding operations are carried out sequentially in the third and fourth cameras $C_3$ and $C_4$.

Figure 4:
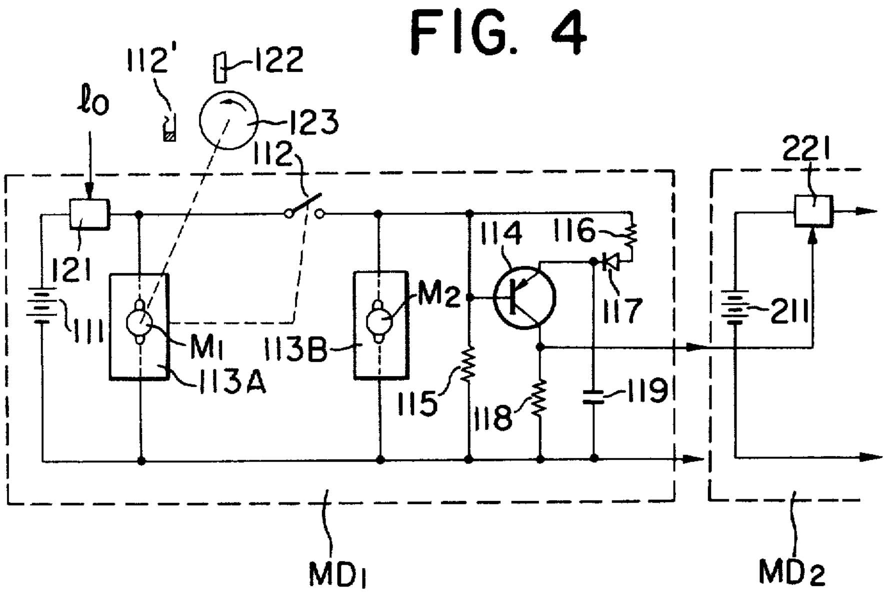
FIG. 4 is a diagram of a control circuit in each of the automatic film winding devices shown in FIG. 3.

FIG. 4 shows a circuit diagram of the control circuit incorporated in the automatic winding device $MD_1$. Reference numeral 111 denotes a power source consisting of batteries; 113A is a load circuit connected to a motor $M_1$ for driving a cam 123 which in turn drives an actuating member 122 operatively coupled to a shutter release mechanism of the first camera $C_1$; 113B is a load circuit connected to a motor $M_2$ for driving the film winding mechanism in the camera $C_1$; and 114–119 are component parts of the control pulse generating circuit similar to those indicated in FIG. 1. Reference numerals 121 and 221 denote the switching circuits which comprise monostable multivibrators and are connected to the control circuits in the automatic film winding devices $MD_1$ and $MD_2$ respectively.

In response to the trigger signal transmitted over the lead wire $l_0$, the switching circuit 121 is closed so that the motor $M_1$ connected to the load circuit 113A is driven. As a result the cam 123 which is coupled to the driving shaft of the motor $M_1$ is rotated thereby causing the actuating member 122 to release the shutter of the camera $C_1$. The cam 123 continues its rotation and closes a contact 112' of a switch 112 after the picture has been taken, thereby driving the motor $M_2$. Therefore the shutter charging mechanism and the film winding mechanism are driven. The monostable multivibrator 121 is so designed that it returns to the stable state from the astable state upon completion of the film winding operation. Therefore upon completion of the film winding operation, both the motors $M_1$ and $M_2$ are stopped. When the switching circuit 121 turns off, the transistor 114 is turned on so that the capacitor 119 is discharged through the transistor 114 and the resistor 118. As a result a positive control pulse signal is generated and is applied to the switching circuit 221 of the second film winding device $MD_2$ as a triggering signal. In a manner similar to that described above, the shutter of the second camera $C_2$ is released, the shutter mechanism is charged and the film winding device is driven. The same operations are cycled in the third and fourth cameras sequentially in response to the pulse signals transmitted from the preceding automatic film winding devices.

Figure 5:
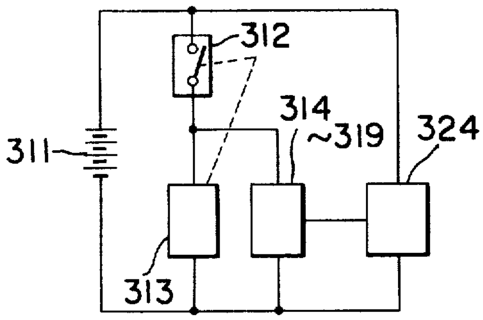
FIG. 5 is a diagram of an electronic circuit of an exposure control device for a camera incorporating the control pulse signal generating circuit of the type shown in FIG. 1 or FIG. 2.

FIG. 5 is a circuit diagram of a control circuit using a pulse signal generator of the present invention for controlling an exposure control device incorporated in a camera. Reference numeral 311 denotes a battery; 312 denotes a switch which is opened in response to the signal from an aperture actuating circuit 313; 314–319 denote the component parts which constitute the pulse signal generating circuit in accordance with the present invention; and 324 is a shutter control circuit.

In response to the shutter release operation, an ON-OFF switch is closed so that the aperture actuating circuit 313 is energized. A servomotor which is coupled to the aperture actuating circuit 313 is energized so that the aperture setting device sets an aperture depending upon the brightness of a subject. Upon completion of the aperture setting operation, the switch 312 is opened the pulse generating circuit 314-319 applies the pulse signal to the shutter actuating circuit 324 so that the shutter is opened for a predetermined time and then closed. In summary when the shutter release button or the like is depressed, a predetermined aperture is set and then the shutter is actuated with a predetermined shutter speed.

Figure 6:
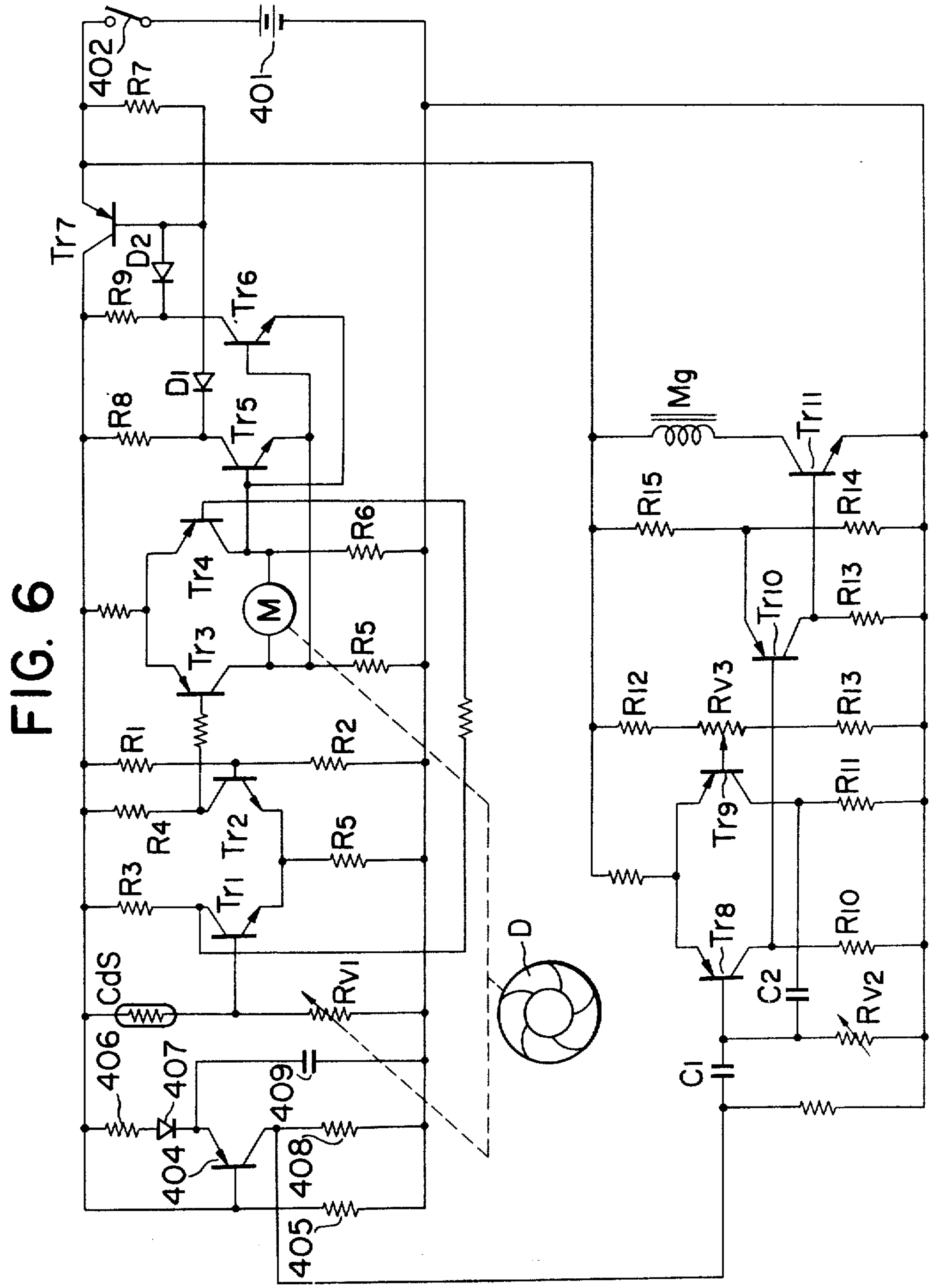
FIG. 6 is a detailed circuit diagram of the circuit as shown in FIG. 5.

FIG. 6 is a diagram of a practical circuit of the circuit shown in FIG. 5. Reference numeral 401 designates a power source consisting of batteries; 402, an ON-OFF switch which is closed when the shutter release button or the like is depressed; CdS, a photoconductive element for receiving the light from a subject; $RV_1$, a variable resistor operatively coupled to a servomotor to be described hereinafter in detail for varying the resistance; $R_1$ and $R_2$, resistors which constitute a bridge circuit together with the photoelectric element CdS and the variable resistor $RV_1$; $Tr_1$ and $Tr_2$, transistors whose bases are connected to the junctions between the arms of the bridge circuit and which constitute a differential amplifier; $R_3$ and $R_4$, collector resistors of the transistors $Tr_1$ and $Tr_2$; $R_5$, a common emitter resistor; $Tr_3$ and $Tr_4$, transistors whose bases are connected to the collectors of the transistors $Tr_1$ and $Tr_2$ and which constitute a differential amplifier; M, a servomotor interconnected between the collectors of the transistors $Tr_3$ and $Tr_4$ and adapted to drive the variable resistor $RV_1$ and an aperture setting device D; $Tr_5$ and $Tr_6$, transistors whose bases are connected to the collectors of the transistors $Tr_4$ and $Tr_3$; $Tr_7$, a switching transistor for interrupting the current flow; $R_5$–$R_9$, fixed resistors; 404–409, component parts corresponding to the component parts 4–9 respectively of the control pulse generating circuit shown in FIG. 1; $C_1$, a coupling capacitor; $Tr_8$ and $Tr_9$, transistors constituting a monostable multivibrator; $c_2$ and $RV_2$, a capacitor and a resistor forming a time constant circuit; $Tr_{10}$ and $Tr_{11}$, transistors which constitute a switching circuit; and Mg, a magnet coupled to the collector of the transistor $Tr_{11}$ for holding a trailing curtain or second blind of a conventional shutter.

Next the mode of operation will be described. Upon depression of the shutter release button, the switch 402 is closed, the capacitor 409 is charged, and the circuit is energized. When the bridge circuit consisting of the photoconductive element CdS, the variable resistor $RV_1$, and two resistors $R_1$ and $R_2$ is unbalanced, the servomotor M is rotated to vary the resistance of the variable resistor $RV_1$, thereby balancing the bridge circuit. When the bridge circuit is balanced the servomotor is stopped so that the aperture setting device D sets an aperture depending upon the brightness of a subject.

When there is a difference in collector potential between the transistors $Tr_3$ and $Tr_4$ which drive the servomotor M, the transistors $Tr_5$ and $Tr_6$ are conducted as soon as the servomotor M is driven so that the transistor $Tr_7$ is also turned on. Therefore the transistor $Tr_7$ keeps feeding the current, but when the difference in collector potential between the transistors $Tr_3$ and $Tr_4$ approaches zero, the transistor $Tr_7$ is cut off so that the current flow is interrupted. As a result the pulse generating circuit 404–409 generates a pulse signal which is applied to the base of the transistor $Tr_8$. Therefore the monostable multivibrator consisting of the transistors $Tr_8$ and $Tr_9$ makes a transition and the magnet Mg is energized so as to hold the trailing curtain. The aperture has been set to the optimum value by the servomotor M and the shutter is opened for a time during which the magnet Mg holds the trailing curtain. Thus the optimum exposure with the optimum exposure time or shutter speed depending upon the time constant obtained by the time constant circuit $C_2$ and $RV_2$.

The leading curtain of the shutter is released by a shutter release circuit (not shown) which is actuated in response to the signal applied from the resistor 408.

As described above, the pulse signal which is generated upon completion of the aperture setting operation is used as the signal for actuating the shutter release circuit (not shown). In other words, unless the aperture setting operation is not accomplished the shutter is not released. Thus the exposure operation is fully safeguarded.

In the embodiment described above, the shutter speed is fixed by the time constant circuit $RV_2$ and $C_2$, but it will be understood that the shutter speed may be varied by varying the resistance of the variable resistor $RV_2$. However the resistor which is one arm of the bridge circuit must be corrected depending upon a shutter speed.

From the foregoing description it is seen that the present invention provides a control pulse signal generating circuit which is very effective especially when a series of various controls are accomplished sequentially. The pulse generating circuit of the present invention is very simple in construction and is adapted to be incorporated in various control circuits.

The present invention has been described in detail with particular reference to the automatic film winding device for a camera and the like, but it will be understood that the present invention may be applied to various control circuits other than used in a camera.

I claim:

1. A control circuit for continuously and sequentially actuating at least three controlled devices, the control circuit comprising, at least two control units (MD1, MD2) serially connected, each of which control unit corresponds to one of said controlled devices and provides a trigger signal for the next succeeding one at an output upon completion of the actuation of one of said controlled devices, each of said control units comprising:

a. a power source (111);

b. driving means (113A, 113B) connected to said power source for driving a corresponding one of said controlled devices;

c. switching means (121, 112) for controlling turning on and off said driving means; and d. semiconductor switching circuit means connected across said driving means for generating the trigger signal upon completion of the actuation of the corresponding one of said controlled devices, said semiconductor switching circuit means comprising a semiconductor switching element (114), resistor means (118) for establishing a voltage for the trigger signal and storage means connected to be charged upon application of the voltage from said power source and discharged through said semiconductor switching element and said resistor means.

2. A control circuit as defined in claim 1, wherein said switching means comprises a monostable multivibrator whose time constant is equal to the time required for driving the corresponding one of said controlled devices.

3. A control circuit as defined in claim 1, wherein said storage means comprises a capacitor (119).

4. A control circuit as defined in claim 1, wherein said storage means comprises an inductor (19).

5. A control circuit as defined in claim 1, wherein said switching means comprises first and second switching elements and said driving means comprises first and second driving elements connected across said power source, said first switching element connected between said power source, and said second driving element being opened after said first driving element completes its function, and said second switching element being associated with said first driving element so as to be turned on after the completion of the function of said first driving element to control said second driving element.

* * * * *